(12) United States Patent
    Corstiaans et al.

(10) Patent No.: US 11,354,786 B2
(45) Date of Patent: Jun. 7, 2022

(54) METHOD FOR MASKING AN IMAGE OF AN IMAGE SEQUENCE WITH A MASK, COMPUTER PROGRAM, MACHINE-READABLE STORAGE MEDIUM AND ELECTRONIC CONTROL UNIT

(71) Applicant: Robert Bosch GmbH, Stuttgart (DE)

(72) Inventors: Bart Corstiaans, Oisterwijk (NL); Konrad Simon, Feucht (DE); Rainer Bauereiss, Baiersdorf (DE); Sachin Khanna, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 120 days.

(21) Appl. No.: 16/754,232

(22) PCT Filed: Oct. 10, 2017

(86) PCT No.: PCT/EP2017/075739
    § 371 (c)(1),
    (2) Date: Apr. 7, 2020

(87) PCT Pub. No.: WO2019/072374
    PCT Pub. Date: Apr. 18, 2019

(65) Prior Publication Data
    US 2021/0201453 A1    Jul. 1, 2021

(51) Int. Cl.
    *G06T 5/00*    (2006.01)
    *G06T 5/20*    (2006.01)
    (Continued)

(52) U.S. Cl.
    CPC ............. *G06T 5/004* (2013.01); *G06T 5/20* (2013.01); *G06T 11/001* (2013.01); *G08B 13/19686* (2013.01)

(58) Field of Classification Search
    CPC ........ G08B 13/19686; G06T 5/00–004; G06T 5/20; G06T 11/0001
    See application file for complete search history.

(56) References Cited

U.S. PATENT DOCUMENTS

| 5,896,469 A | 4/1999 | Murakami |
| 6,480,300 B1 | 11/2002 | Aoyama |

(Continued)

FOREIGN PATENT DOCUMENTS

| DE | 10334136 | 3/2005 |
| WO | 9847117 | 10/1998 |
| WO | 2013137534 | 9/2013 |

OTHER PUBLICATIONS

International Search Report for Application No. PCT/EP2017/075739 dated Mar. 9, 2018 (English Translation, 3 pages).

*Primary Examiner* — Sean T Motsinger
(74) *Attorney, Agent, or Firm* — Michael Best & Friedrich LLP

(57) ABSTRACT

The invention relates to a method for masking an image (20) of an image sequence with a mask (30), wherein a mask colour is determined according to an image colour of the image (20) in the environment of the mask (30), and a colour of the mask (30) is set according to the determined mask colour or with the determined mask colour. The invention also relates to a computer program, a machine-readable storage medium and an electronic storage unit.

13 Claims, 2 Drawing Sheets

(51) Int. Cl.
*G06T 11/00* (2006.01)
*G08B 13/196* (2006.01)

(56) References Cited

U.S. PATENT DOCUMENTS

| | | | |
|---|---|---|---|
| 7,483,058 B1* | 1/2009 | Frank | H04N 9/04557 348/222.1 |
| 9,350,914 B1* | 5/2016 | Kaur | G06T 5/002 |
| 2006/0055777 A1 | 3/2006 | Ito et al. | |
| 2009/0189980 A1* | 7/2009 | Kim | H04N 5/23206 348/143 |
| 2011/0080401 A1* | 4/2011 | Tan | H04N 13/122 345/419 |
| 2012/0075484 A1* | 3/2012 | Kawamoto | G06T 19/006 348/207.1 |
| 2014/0049655 A1 | 2/2014 | Iwasaki | |
| 2014/0118545 A1* | 5/2014 | Iwasaki | H04N 5/23299 348/143 |
| 2015/0222861 A1* | 8/2015 | Fujii | G06T 11/00 348/143 |
| 2018/0122033 A1* | 5/2018 | Mayuzumi | G06T 5/50 |
| 2018/0122117 A1* | 5/2018 | Kawano | G06T 7/60 |
| 2018/0180883 A1* | 6/2018 | Tuli | G02B 27/0172 |
| 2018/0189983 A1* | 7/2018 | Lee | G11B 27/28 |
| 2018/0359449 A1* | 12/2018 | Matsumoto | G06T 7/215 |
| 2021/0163152 A1* | 6/2021 | Matsumoto | G09F 19/12 |
| 2021/0201453 A1* | 7/2021 | Corstiaans | G06T 11/001 |

\* cited by examiner

METHOD FOR MASKING AN IMAGE OF AN IMAGE SEQUENCE WITH A MASK, COMPUTER PROGRAM, MACHINE-READABLE STORAGE MEDIUM AND ELECTRONIC CONTROL UNIT

BACKGROUND OF THE INVENTION

The invention relates to a method for masking an image of an image sequence with a mask as well as a computer program, a machine-readable storage medium and an electronic control unit.

The international laid-open specification WO 98/47117 A1 discloses a safety system with a camera, wherein the field of vision of the camera is adjustable. The field of vision of the camera is masked by a mask with a non-adjustable color.

SUMMARY OF THE INVENTION

The method according to the invention for masking an image of an image sequence with a mask, wherein a mask color is determined according to an image color of the image in the environment of the mask and a color of the mask is adjusted according to the determined mask color or with the determined mask color, has the advantage that this allows a smooth transition from the visible range of the image to the mask. Observers of the image, in particular operators of a camera-based monitoring center with a plurality of monitors to be watched are distracted to a lesser degree. Overall the method thus contributes to enhancing the attention of the operators and thus to a greater acceptance of monitoring centers. For an observer of the image sequence the method contributes to a comfortable use because the distraction of the observer is reduced to a minimum, but personal privacy is ensured due to the masking. It is especially advantageous to use the method for masking scenes in the outdoor area because scenes in the outdoor area may comprise great color differences during the course of the day. Thus for example buildings reproduced in the images appear bright in sunshine during the day, whilst the same building at night appears almost black. The method thus has the advantage of being able to be used at any time of the day. The advantage of the method becomes particularly clear when masking outdoor scenes during the course of the day because the color of the mask during the day continuously adapts to the changing light and the changing colors in the environment.

It is particularly advantageous that the mask is single-color, in particular exclusively single-color, because a homogenous single-color mask without pattern means that distraction for an observer is particularly low allowing the observer of the image sequence to concentrate on observing the non-masked parts of the image. Furthermore a single-color mask has the advantage that there is no way in which information about the image content below the mask could become visible via the mask. If for example a red car is in the image area below the mask, this image information, due to the method according to the invention, is not transferred into the selected color of the mask. This contributes to ensuring personal privacy.

Furthermore it is advantageous that the color of the mask is adjusted according to the determined mask color and a previous color of the mask, in particular the current color of the mask, wherein the color of the mask is preferably adjusted by means of an IIR filter, preferably at a frequency between 5 and 15 Hertz, in particular at a frequency of 10 Hertz. This has the advantage that for a change in the environment of the mask the change in color of the mask is continuous without this leading to noticeable jumps in the color of the mask. Observers are not distracted by this approach.

Furthermore it is advantageous that the color of the mask with the determined mask color is re-adjusted with a low-pass filter using temporal filtering. It is advantageous that the color of the mask is calculated from a surrounding rectangle of the mask with the width of one pixel. An average color value for the mask is determined from the color values of these pixels. This determination is preferably made for each image of the image sequence, but the color value determined as the mask color is applied to the mask itself only after low-pass filtering in order to ensure constant adaptation without a high updating frequency occurring. This contributes to keeping the distraction for the observer of the image sequence to a low level. Moreover this approach has the advantage that a necessary computing capacity is low since the color of the mask needs to be calculated and changed less frequently.

It is particularly advantageous that the image color of a part of the image, which is masked by the mask, is not taken into account when determining the mask color. This contributes to ensuring the personal privacy of people in the image area, since image information from parts of the image which are hidden by the mask, does not affect the color of the mask.

It is advantageous that the mask color is determined by averaging pixel colors of pixels of the image adjacent, in particular directly adjacent, to an edge of the mask. It is particularly advantageous that averaging is effected by separately averaging basic color information, preferably of three elements of basic color information, in particular from the YUV color model and/or according to the RGB color model. This allows particularly good adaptation of the color of the mask to the environment. It is particularly advantageous to perform this averaging as arithmetic averaging since this means that the colors of all pixels are equally taken into account.

The invention further relates to a computer program which is arranged to execute all steps of the described method for masking an image of an image sequence with a mask. Further the invention relates to a machine-readable storage medium, in particular a non-volatile machine-readable storage medium on which the computer program is stored. Moreover the invention relates to an electronic control unit which is arranged to execute all steps of the described method. The advantages described with reference to the method analogously also apply to the computer program, the storage medium and the electronic control unit.

BRIEF DESCRIPTION OF THE DRAWINGS

Further advantages are revealed in the description hereunder of exemplary embodiments with reference to the figures and the dependent claims.

Exemplary embodiments of the invention are depicted in the drawings by way of a number of figures and explained in detail in the description hereunder, in which.

DETAILED DESCRIPTION

A method for masking an image of an image sequence with a mask is described hereunder, wherein a mask color is determined according to an image color of the image in the environment of the mask and a color of the mask is adjusted according to the determined mask color or with the determined mask color. Further described are a computer program, a machine-readable storage medium and an electronic control unit for performing the method for masking an image of an image sequence with a mask.

Figure 1:
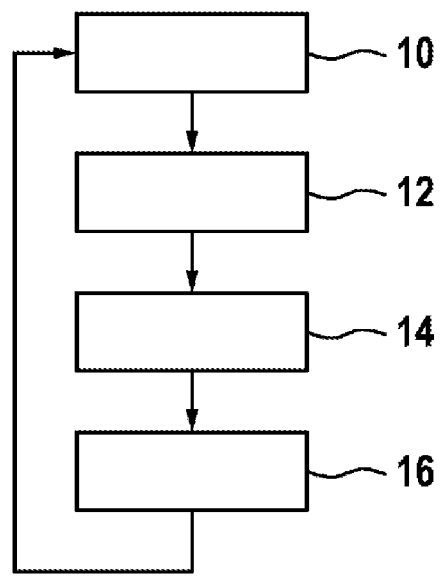
FIG. 1 shows a flow diagram of the method for masking an image of an image sequence with a mask.

FIG. 1 shows a flow diagram of the method for masking an image of an image sequence with a mask in the preferred exemplary embodiment. In a first method step 10 a camera captures an image of a sequence of images. The camera used in the preferred exemplary embodiment is a color video camera. In a second method step 12 the image is masked with a rectangular mask of a predetermined size at a predetermined point of the image. In a third method step 14 a mask color is determined according to an image color of the image in the environment of the mask. In the preferred exemplary embodiment the mask color is determined by averaging pixel colors of pixels of the image adjacent, in particular directly adjacent, to an edge of the mask. Preferably the pixels are chosen such that the chosen pixels completely enclose the edge of the mask and/or that no further pixels are present between the chosen pixels and the edge of the mask. In the preferred exemplary embodiment averaging is performed further by averaging basic color information, in particular three elements of basic color information. In the preferred exemplary embodiment color averaging is performed by way of the YUV color model, wherein the arithmetic mean of all pixels of the surrounding, in particular enveloping, rectangle is calculated for the components of the YUV color model, in particular for each component of the YUV color model, in particular for the Y-component and/or the U-component and/or the V-component. The color information of the pixels is present as YUV color information. With the YUV model two components, the luminance Y (brightness) and the chrominance (color) are used to encode the color information of the pixel, wherein the chrominance consists of the two sub-components U and V. Of all chosen pixels the mean values are formed for the three elements of basic color information YUV, and the new YUV basic color information obtained therefrom is chosen as the mask color. Apart from the preferred arithmetic averaging an alternative or additional averaging is performed in a variant by forming the median. In a fourth method step 16 the color of the mask is adjusted according to the determined mask color or with the determined mask color. In the preferred exemplary embodiment temporal adaptation of the color of the mask is effected by means of an IIR loop filter (IIR filter) according to the determined mask color. The IIR loop filter (infinite impulse response filter) is a discrete filter, for which when calculating the next output value, here the new color of the mask, values of the current output variable, here the current color of the mask, are also used. In the preferred exemplary embodiment the new color of the mask results from the weighting of 0.25*determined mask color+0.75*current color of the mask, in particular from the previous calculation. Calculation of the color of the mask is effected at a target frame rate of 10 fps (10 frames per second or 10 images per second), wherein calculation of the color of the mask is performed independently of the actual video frame rate, wherein the actual video frame rate may be higher or lower. The color of the mask is thus re-adjusted according to the determined mask color using temporal low-pass filtering. In a variant of the preferred exemplary embodiment a low-pass filter is used as an alternative to the IIR loop filter, wherein the color of the mask with the determined mask color is re-adjusted with a low-pass filter using temporal filtering. The method is then repeated starting with the first method step 10, i.e. it is repeated continuously. In a variant masking is performed only once, and merely the color of the mask is adjusted according to the described method.

Figure 2:
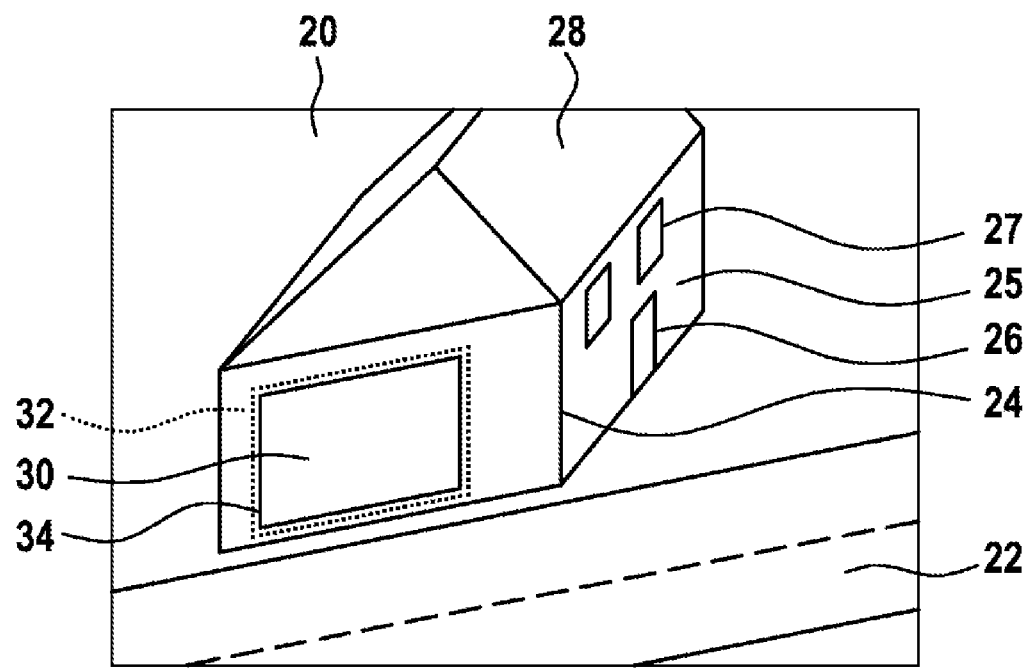
FIG. 2 shows a masked image.

FIG. 2 shows a masked image 20, wherein the masked image 20 was generated by means of the method described above with reference to FIG. 1. The depicted image 20 is a single frame from an image sequence which is generated by means of a video camera. The image 20 shows a street 22 and a house 24. The house 24 consists of walls 25 and a roof 28. On one wall 25 of the house 24 windows 27 and a door 26 have been depicted. The part of the image 20 which shows the side of the house 24 facing the road 22 is masked by a mask 30 in order to protect the personal privacy of the occupants of the house 24. Also schematically depicted are the pixels 32 used for determining the mask color, which are present on the edge 34 of the mask.

Figure 3:
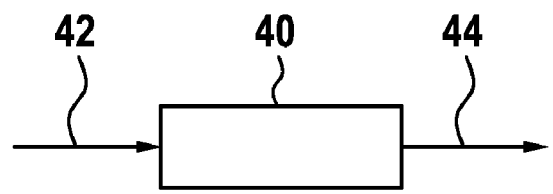
FIG. 3 shows a control unit.

FIG. 3 shows an electronic control unit 40, which is arranged to execute all steps of the method described with reference to FIG. 1. The electronic control unit 40 comprises a microprocessor and a non-volatile memory. The non-volatile memory has a computer program stored in it, wherein the computer program is arranged to execute the method described with reference to FIG. 1. The electronic control unit 40 receives an unmasked image 42 as input data and outputs an image 44 as output data masked according to the described method. In the preferred exemplary embodiment the electronic control unit is arranged in a camera, in particular in a monitoring camera, for example a securely installed monitoring camera or a pan-tilt-zoom camera. In the preferred exemplary embodiment the electronic control unit is further configured for real time processing of live images.

In a variant of the preferred exemplary embodiment the method is performed for stored images of an image sequence. Storing of the images is effected in particular in the camera itself or in an external storage medium, in particular a video recorder. Preferably the electronic control unit is arranged in the video recorder.

The invention claimed is:

1. A method for masking an image (20) of an image sequence with a mask (30), the method comprising:
determining, with a microprocessor, a mask color according to an image color of the image (20) in the environment of the mask (30); and
adjusting, via a digital filter, a color of the mask (30) according to the determined mask color or with the determined mask color,
wherein the mask color is determined by averaging pixel colors of pixels (32) of the image (20) adjacent to an edge (34) of the mask (30).

2. The method as claimed in claim 1, wherein the mask (30) is single-color.

3. The method as claimed in claim 1 wherein the color of the mask (30) is adjusted according to the determined mask color and a previous color of the mask (30).

4. The method as claimed in claim 3, wherein the color of the mask (30) is adjusted via an IIR filter at a frequency of 5 Hz to 15 Hz.

5. The method as claimed in claim 1, wherein the color of the mask (30) with the determined mask color is re-adjusted with a low pass filter using temporal filtering.

6. The method as claimed in claim 1 wherein the mask (30) is shaped as a rectangle.

7. The method as claimed in claim 1 wherein the image color of a part of the image (20), which is masked by the mask (30), is not taken into account when determining the mask color.

8. The method as claimed in claim 1, wherein averaging is effected by separately averaging basic color information from a YUV color model.

9. A non-transitory, computer-readable storage medium containing instructions that when executed by the computer cause the computer to determine a mask color according to an image color of the image (20) in the environment of the mask (30); and adjust a color of the mask (30) according to the determined mask color or with the determined mask color, wherein the mask color is determined by averaging pixel colors of pixels (32) of the image (20) adjacent to an edge (34) of the mask (30).

10. An electronic control unit (40), configured to receive, via an input interface, an unmasked image (42) as an image (20) of an image sequence, mask the image (20) with a mask (30) and to determine a mask color of the mask (30) according to an image color of the image (20) in the environment of the mask (30) and to adjust, a color of the mask (30) according to the determined mask color, wherein the mask color is determined by averaging pixel colors of pixels (32) of the image (20) adjacent to an edge (34) of the mask (30).

11. The method as claimed in claim 8, wherein averaging is effected by separately averaging basic color information from a RGB color model.

12. The method of claim 1, wherein the masking an image (20) of an image sequence is performed to protect the privacy of a subject of the mask.

13. The method of claim 1, wherein the image sequence consists of real time live images.

\* \* \* \* \*